US008011403B2

(12) United States Patent
Nakagawa

(10) Patent No.: US 8,011,403 B2
(45) Date of Patent: *Sep. 6, 2011

(54) PNEUMATIC TIRE FOR MOTORCYCLE HAVING CENTER, INTERMEDIATE AND SHOULDER RUBBER

(75) Inventor: Hidemitsu Nakagawa, Saitama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/670,083

(22) PCT Filed: Jun. 20, 2008

(86) PCT No.: PCT/JP2008/061344
§ 371 (c)(1),
(2), (4) Date: Jan. 21, 2010

(87) PCT Pub. No.: WO2009/013961
PCT Pub. Date: Jan. 29, 2009

(65) Prior Publication Data
US 2010/0193095 A1    Aug. 5, 2010

(30) Foreign Application Priority Data
Jul. 24, 2007 (JP) .................................. 2007-192468

(51) Int. Cl.
*B60C 1/00* (2006.01)
*B60C 11/00* (2006.01)

(52) U.S. Cl. ........... 152/209.5; 152/209.11; 152/209.17; 152/209.28

(58) Field of Classification Search ................ 152/209.5, 152/209.11, 209.17, 209.28
See application file for complete search history.

(56) References Cited

U.S. PATENT DOCUMENTS

| | | | | |
|---|---|---|---|---|
| 4,407,346 A | * | 10/1983 | Bandel et al. | 152/209.5 |
| 5,373,886 A | * | 12/1994 | Yamaguchi et al. | 152/526 |
| 6,619,355 B1 | * | 9/2003 | Niizato | 152/DIG. 12 |
| 2003/0000616 A1 | * | 1/2003 | Watkins et al. | 152/209.5 |
| 2005/0115653 A1 | | 6/2005 | Miyasaka et al. | |
| 2006/0102266 A1 | * | 5/2006 | Ravasio et al. | 152/209.5 |

(Continued)

FOREIGN PATENT DOCUMENTS
JP        05-201907    *  8/1993
(Continued)

OTHER PUBLICATIONS
Machine translation for Japan 2005-022622 (no date).*
(Continued)

*Primary Examiner* — Steven D Maki
(74) *Attorney, Agent, or Firm* — Sughrue Mion, PLLC

(57) ABSTRACT

A pneumatic tire for motorcycle includes a tread portion; a pair of sidewall portions; and bead portions, wherein a ground contact region of the tread portion has five regions including a center region including the tire equatorial plane; a pair of shoulder regions including ground contact ends of the tread; and a pair of intermediate regions located between the center region and the respective shoulder regions. At a room temperature of 25° C., 100% modulus of intermediate tread rubber provided across the entire part of each intermediate region is set larger than each of 100% modulus of center tread rubber and 100% modulus of shoulder tread rubber, and a negative ratio in the ground contact region of the tread is set so as to gradually increase from the respective shoulder regions toward the center region.

4 Claims, 2 Drawing Sheets

U.S. PATENT DOCUMENTS

| | | |
|---|---|---|
| 2006/0207701 A1 | 9/2006 | Tanaka |
| 2007/0137747 A1* | 6/2007 | Yoshida ................ 152/209.5 |
| 2009/0173420 A1* | 7/2009 | Katayama et al. ......... 152/209.5 |
| 2010/0024938 A1* | 2/2010 | Ishiyama ................ 152/209.5 |
| 2010/0163145 A1* | 7/2010 | Nakagawa ................ 152/209.5 |
| 2010/0175800 A1* | 7/2010 | Nakagawa ................ 152/209.5 |
| 2010/0180996 A1* | 7/2010 | Nakagawa ................ 152/209.5 |
| 2010/0193095 A1* | 8/2010 | Nakagawa ................ 152/209.5 |

FOREIGN PATENT DOCUMENTS

| | | | |
|---|---|---|---|
| JP | 07-195906 | * | 8/1995 |
| JP | 10-119513 A | | 5/1998 |
| JP | 2000-158910 | * | 6/2000 |
| JP | 2000-158910 A | | 6/2000 |
| JP | 2003-211917 A | | 7/2003 |
| JP | 2004-351956 A | | 12/2004 |
| JP | 2005-022622 | * | 1/2005 |
| JP | 2006-256385 A | | 9/2006 |
| JP | 2006-273240 A | | 10/2006 |
| JP | 2006-273248 A | | 10/2006 |
| JP | 2007-099147 A | | 4/2007 |
| JP | 2007-168531 A | | 7/2007 |
| WO | 2007/055322 | * | 5/2007 |
| WO | 2007-055322 A1 | | 5/2007 |

OTHER PUBLICATIONS

Machine translation for Japan 2000-158910 (no date).*
Machine translation for Japan 07-195906 (no date).*
Machine translation for Japan 05-201207 (no date).*
European Office Action for EP08777488 dated Jun. 28, 2011.

* cited by examiner

PNEUMATIC TIRE FOR MOTORCYCLE HAVING CENTER, INTERMEDIATE AND SHOULDER RUBBER

TECHNICAL FIELD

The present invention relates to a pneumatic tire for motorcycle and proposes, in particular, a technique which enables stable running of the tire on either a dry or wet road surface.

PRIOR ART

A tire for motorcycle, different from a tire for a four-wheel vehicle such as bus, truck or the like which effects cornering mainly by being imparted with a slip angle, need be imparted with a camber angle for inclining the tire with respect to a road surface for running thereof in a cornering situation. Accordingly, in a tire for motorcycle, a ground contact region of a tread portion differs between straight running and a cornering situation.

Specifically, in a tire for a motorcycle, the center region thereof including the tire equatorial plane of a tread portion is brought into contact with a road surface in straight running to function to exert driving force or braking force on the road surface, while respective shoulder regions thereof including ground contact ends of the tread are brought into contact with the road surface in a cornering situation to function to generate lateral force resisting centrifugal force being exerted on the motor cycle. Further, respective intermediate regions located between the center region and the respective shoulder regions function to exert driving force or braking force on a road surface in, for example, an accelerating situation to get out of a corner or the like and generate lateral force resisting centrifugal force in a cornering situation.

It is not possible to make a pneumatic tire for motorcycle fully demonstrate the aforementioned functions of the respective contact regions of a tread portion thereof by selecting a single rubber species or single rubber hardness or the like of tread rubber provided in the tread portion.

In view of this problem, JP 2006-273240 proposes, in view of running performance of a tire for motorcycle on a dry road surface, a pneumatic tire for motorcycle in which a ground contact region of a tread portion is divided into three regions, i.e. the center region and respective shoulder regions, and tread rubbers provided in the respective regions are each selected to be a rubber material having an appropriate ratio of loss tangent with respect to dynamic modulus of elasticity, such that durability at a relatively high speed in straight running effected by the center region and gripping properties and stability in a cornering situation effected by a shoulder region are both improved.

However, in the pneumatic tire for motorcycle disclosed in JP 2006-273240, although durability at a relatively high speed effected by the center region and gripping properties and stability in a cornering situation effected by a shoulder region are both improved, results are still unsatisfactory in exertion of driving force or braking force on a road surface and generation of lateral force as a force resisting centrifugal force, which need be effected by the respective intermediate regions which extend between the center region and the respective shoulder regions and are brought into contact with a road surface particularly in an accelerating situation to get out of a corner. Further, in this pneumatic tire for motorcycle, there is a concern that partial wear or the like may be generated in the intermediate regions and the vicinities thereof as a result of, in particular, running in a cornering situation.

Further, in a case where two types of tread rubbers, which significantly differ from each other in ratio of loss tangent with respect to dynamic modulus of elasticity, are used for the center region and the shoulder regions, respectively, rubbers of different types are subsequently or simultaneously brought into contact with the ground as a camber angle increases or decreases, whereby the ground contact properties of the tread rubber significantly change as the camber angle changes and stability in running at a cornering situation may be significantly affected.

DISCLOSURE OF THE INVENTION

Problems to be Solved by the Invention

In view of the facts described above, an object of the present invention is to provide a pneumatic tire for motorcycle, in which driving properties and braking properties when a moderate camber angle is imparted to the tire on a dry road surface are improved without deteriorating stability in running, relatively large lateral force is reliably generated, and excellent wet performance is demonstrated without deteriorating dry performance of the tire, so that stable running is constantly enabled.

Means for Solving the Problems

The present invention provides a pneumatic tire for motorcycle comprising:

a tread portion containing tread rubber having a layered structure including at least one layer; a pair of sidewall portions extending on the inner side in the radial direction and provided continuous with respective side portions of the tread portion; and bead portions provided continuous with the inner peripheral sides of the respective sidewalls, wherein a ground contact region of the tread portion is constituted of five regions consisting of: a center region including the tire equatorial plane; a pair of shoulder regions including ground contact ends of the tread; and a pair of intermediate regions located between the center region and the respective shoulder regions, 100% modulus at the room temperature (25° C.) of a portion forming at least a ground contact surface of intermediate tread rubber provided across the entire part of each intermediate region is set larger than each of 100% modulus of a portion forming at least a ground contact surface of center tread rubber provided across the entire part of the center region and 100% modulus of a portion forming at least a ground contact surface of shoulder tread rubber provided across the entire part of each shoulder region in a similar condition, and a negative ratio in the ground contact region of the tread, which is a ratio of groove areas with respect to the ground contact region, is set so as to gradually increase from the respective shoulder regions toward the center region.

In the present invention, "tread rubber having a layered structure including at least one layer" means that the tread rubber may be that having a single-layer structure or that having a layered structure including two or more layers such as cap and base structure.

Further, in the present invention, "100% modulus" represents a tensile stress value measured by preparing a JIS dumbbell-shaped No. 3 sample and conducting a tensile test at a rate of 500±25 mm/min at the room temperature in accordance with JISK6251.

In the present invention, peripheral lengths in a section in the tire meridian direction, of the outer surfaces of the intermediate tread rubber, the center tread rubber and the shoulder tread rubber, may be set in the range of 10-40%, 10-35% and 5-35%, respectively, with respect to the entire peripheral length of the ground contact region.

More specifically, each "peripheral length" represents a length along the outer surface measured in the tire meridian direction in a state where a tire assembled with a prescribed rim is inflated at the predetermined air pressure. In this structure, "a prescribed rim" represents a rim prescribed by the standards described below according to the tire size, "the predetermined air pressure" represents an air pressure prescribed by the standards below in accordance with the maximum load capacity, and "the maximum load capacity" represents the maximum mass which may be loaded on the tire according to the standards described below.

In the present invention, an inactive gas or the like such as nitrogen gas may be used as a substitute of "air" described above.

In the present invention, a "Standard" represents an industrial standard effective in an area where the tire is produced or used. Examples of such a standard as described above include "YEAR BOOK" by THE TIRE AND RIM ASSOCIATION, INC. in the United States, "STANDARDS MANUAL" by The European Tyre and Rim Technical Organisation in Europe and "JATMA YEAR BOOK" by The Japan Automobile Tyre Manufacturers Association, Inc. in Japan.

In the tire of the present invention as described above, it is more preferable to set the negative ratios of the center region, each intermediate region and each shoulder region in the ranges of 6-12%, 3-9% and 1-7%, respectively.

Further, it is more preferable to set 100% modulus of a portion forming at least the ground contact surface of the center tread rubber larger than 100% modulus of a portion forming at least the ground contact surface of the shoulder tread rubber.

Yet further, it is preferable to set 100% modulus of a portion forming at least the ground contact surface of the intermediate tread rubber in the range of 1.3 to 2.1 MPa, 100% modulus of a portion forming at least the ground contact surface of the center tread rubber in the range of 1.0 to 1.8 MPa, and 100% modulus of a portion forming at least the ground contact surface of the shoulder tread rubber in the range of 0.9 to 1.7 MPa.

The sidewall portion of the tire as described above preferably has a display indicating that the tire is for use as a rear tire.

Effect of the Invention

In a pneumatic tire for motorcycle, the center region which is brought into contact with the ground in straight running is required to have physical properties suitable for efficiently exerting driving force or braking force on a road surface, while shoulder regions which are brought into contact with the ground in a cornering situation is required to have physical properties suitable for generating sufficiently strong lateral force.

Further, intermediate regions situated between the center region and the respective shoulder regions, of a tread portion, is required to have physical properties for efficiently exerting driving force or braking force on a road surface in, for example, an accelerating situation to get out of a corner and physical properties for generating sufficiently strong lateral force.

In view of the facts described above, the present invention pays attention to modulus of elasticity of tread rubber as a specific physical property representing rigidity of the tread portion against extension caused by external force.

Further, the present invention employs 100% modulus, which is modulus of elasticity when the elongation ratio is 100%, because it exhibits relatively stable data as a standard of magnitude of modulus.

In the present invention, rigidity in the front-rear direction and rigidity in the lateral direction of the tire can be enhanced by setting 100% modulus of a portion forming at least a ground contact surface of intermediate tread rubber larger than each of 100% modulus of the center tread rubber and 100% modulus of the shoulder tread rubber in similar condition, particularly by ensuring relatively high rigidity of the intermediate regions which are brought into contact with the ground in, for example, an accelerating situation to get out of a corner when a moderate camber angle is imparted to the tire. Accordingly, the intermediate regions can exert relatively strong driving force or braking force, as well as lateral force sufficiently strong for resisting centrifugal force.

Running performance of the tire on a dry road surface when a moderate camber angle is imparted thereto in, for example, an accelerating situation to get out of a corner and slalom can be remarkably improved by setting relatively large 100% modulus of the intermediate tread rubber.

On the other hand, drainage performance need be enhanced by increasing a negative ratio of the ground contact region of the tread in order to improve the running performance of the tire on a wet road surface. However, evenly increasing the negative ratio of the entire ground contact region of the tread results in decrease in gripping force with respect to a dry road surface due to decrease in rigidity in the land portions. Therefore, it is necessary to set the negative ratio as low as possible which is acceptable for the corresponding ground contact region, in order to ensure good wet performance without deteriorating dry gripping performance.

Accordingly, the center region, in particular, is adapted to perform excellent drainage properties by gradually increasing the negative ratio from the respective shoulder regions toward the center region in the present invention in consideration that a relatively large camber angle is not imparted and the tread center region and the vicinities thereof are most frequently used in a general running condition of a motorcycle on a wet road surface having a relatively small friction coefficient, so that running performance on a wet road surface is reliably improved.

In view of the designing described above, it is preferable to set the negative ratio of the center region of the tire of the present invention in the range of 6-12%, the negative ratio of each intermediate region in the range of 3-9%, the negative ratio of each shoulder region in the range of 1-7%.

Specifically, in a case where the negative ratio of the center region exceeds 12%, the dry gripping performance in straight running, in particular, is likely to deteriorate due to decrease in rigidity in the land portions. In a case where the negative ratio of the center region is less than 6%, resistance to hydroplaning is likely to deteriorate.

In a case where the negative ratio of each intermediate region exceeds 9%, the dry gripping performance may deteriorate. In a case where the negative ratio of each intermediate region is less than 3%, wet drainage performance deteriorates to some extent when water on a road surface is relatively deep, although the intermediate regions are not so frequently used on a wet road surface. The situations similar to those described above occur in cases where the negative ratio of each shoulder region is out of the range of 1-7%.

In the tire of the present invention as described above, wear resistance of the tread center region, as a ground contact region in straight running which is most frequently used, can be advantageously improved by setting 100% modulus of a portion forming at least the ground contact surface of the center tread rubber than 100% modulus of a portion forming at least the ground contact surface of the shoulder tread rubber.

More specifically, it is preferable to set 100% modulus of a portion forming at least the ground contact surface of the center tread rubber in the range of 1.0 to 1.8 MPa and 100% modulus of a portion forming at least the ground contact surface of the shoulder tread rubber in the range of 0.9 to 1.7 MPa. Further, 100% modulus of a portion forming at least the ground contact surface of the intermediate tread rubber is set preferably in the range of 1.3 to 2.1 MPa and more preferably in the range of 1.5 to 1.9 MPa.

In other words, in a case where 100% modulus of the center tread rubber is smaller than 1.0 Mpa, wear resistance deteriorates due to insufficient rigidity of the rubber. In a case where 100% modulus of the center tread rubber exceeds 1.8 Mpa, rigidity of the rubber is too high and impact-absorbing properties with respect to an irregular road surface tends to deteriorate.

Further, in a case where 100% modulus of the shoulder tread rubber is smaller than 0.9 Mpa, rigidity of the rubber is too low to ensure rigidity large enough to resist lateral force. In a case where 100% modulus of the shoulder tread rubber exceeds 1.7 Mpa, impact-absorbing properties with respect to an irregular road surface in a cornering situation tends to deteriorate.

Yet further, in a case where 100% modulus of the intermediate tread rubber is smaller than 1.3 Mpa, rigidity of the rubber is insufficient and thus satisfactory driving force, braking force and lateral force cannot be reliably obtained. In a case where 100% modulus of the intermediate tread rubber exceeds 2.1 Mpa, rigidity of the rubber is too high and vibration-absorbing properties and ground contact properties on an irregular road surface tend to deteriorate.

In the tire of the present invention as described above, reliable mounting of the tire to the rear wheel where generation of driving force is essentially required is ensured by displaying in a sidewall portion of the tire that the tire is for use as a rear tire. By doing this, the tire can sufficiently demonstrate braking/driving performance, cornering performance and the like as desired.

EXPLANATION OF REFERENCE NUMERALS

Figure 1:
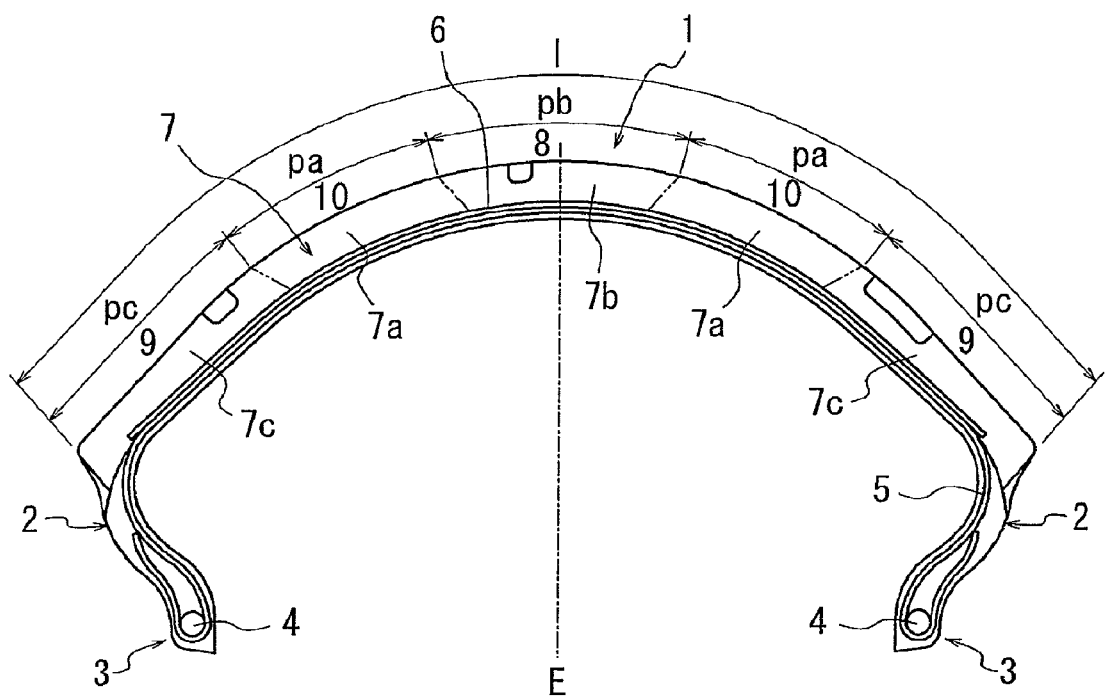
FIG. 1 is a sectional view in the meridian direction, showing an embodiment of the present invention.

1 Tread portion
2 Sidewall portion
3 Bead portion
4 Bead core
5 Carcass
6 Belt
7 Tread rubber
7*a* Intermediate tread rubber
7*b* Center tread rubber
7*c* Shoulder tread rubber
8 Center region
9 Shoulder region
10 Intermediate region
11 Slant groove
E Tire equatorial plane
Pa, pb, pc Periphery
l Entire peripheral length

BEST MODE FOR IMPLEMENTING THE INVENTION

FIG. 1 is a sectional view in the meridian direction of a tire, showing an embodiment of the present invention. In the drawing, the reference number 1 represents a tread portion, 2 represents respective sidewall portions provided continuous with respective side portions of the tread portion 1, and 3 represents respective bead portions provided continuous with the inner peripheral sides of the respective sidewall portions 2.

The tire of the present embodiment further includes: a carcass 5 constituted of at least one (one in the drawing) carcass ply extending from the tread portion 1 via the sidewall portions 2 and having side portions folded up around the bead cores 4 of the bead portions 3, respectively; a belt 6 constituted of at least one belt layer (e.g. a belt layer formed by cords extending in the tread circumferential direction) provided on the outer peripheral side of a crown region of the carcass 5; and a tread rubber 7 provided on the outer peripheral side of the belt 6.

Although the tread rubber 7 has a single-layer structure in the drawing, the tread rubber may have a laminated structure including two or more layers such as cap and base structure.

In the present embodiment, a ground contact region of the tread portion 1 is constituted of five regions in total consisting of: a center region 8 situated to include the tire equatorial plane E as the center thereof; shoulder regions 9 respectively situated to include ground contact ends of the tread; and intermediate regions 10 situated between the center region 8 and the respective shoulder regions 9. Regarding the tread rubber 7 of the tread portion 1, 100% modulus at 25° C. of a portion forming at least a ground contact surface of intermediate tread rubber 7*a* provided across the entire part of each intermediate region 10 (the total thickness portion of the intermediate tread rubber 7*a* in the drawing) is set larger than each of 100% modulus of center tread rubber 7*b* provided across the entire part of the center region 8 and 100% modulus of shoulder tread rubber 7*c* provided across the entire part of each shoulder region 9 in a similar condition.

Further, it is more preferable to set 100% modulus of the center tread rubber 7*b* larger than 100% modulus of the shoulder tread rubber 7*c*.

In the present embodiment, it is preferable to set the aforementioned 100% modulus of the intermediate tread rubber 7*a* in the range of 1.3 to 2.1 MPa, the aforementioned 100% modulus of the center tread rubber 7*b* in the range of 1.0 to 1.8 MPa, and the aforementioned 100% modulus of the shoulder tread rubber 7*c* in the range of 0.9 to 1.7 MPa.

In the respective tread rubbers 7*a*, 7*b*, 7*c* having respective 100% moduli as described, the peripheral length pa of the outer surface of the intermediate tread rubber 7*a* in a section in the tire meridian direction as shown in FIG. 1 is preferably in the range of 10-40%, more preferably in the range of 12-25%, of the entire peripheral length l of the ground contact region. Further, the peripheral lengths pb, pc of the outer surfaces of the center tread rubber 7*b* and the shoulder tread rubber 7*c* in a section in the tire meridian direction as shown in FIG. 1 are preferably in the range of 10-35% and in the range of 5-35%, respectively, of the entire peripheral length l of the ground contact region.

More specifically, in a case where the peripheral length pa of the outer surface of the intermediate tread rubber 7*a* is less than 10% of the entire peripheral length l of the ground contact region, rigidity sufficient to resist each of driving force, braking force and lateral force cannot be reliably obtained. In a case where the peripheral length pa of the intermediate tread rubber 7a exceeds 40% of the entire peripheral length l, the intermediate tread rubber 7a having a relatively high 100% modulus significantly invades into the center region 8 and the shoulder region 9, whereby rigidity of each of the center region and the shoulder region increases more than is required and impact-absorbing properties with respect to an irregular road surface tends to deteriorate.

Further, in a case where the peripheral length pb of the outer surface of the center tread rubber 7b is less than 10% of the entire peripheral length l of the ground contact region, the intermediate tread rubber 7a having a relatively high rigidity occupies a part of the ground contact region in straight running, whereby rigidity of the ground contact region in straight running is unnecessarily high and riding comfort deteriorates. In a case where the peripheral length pb of the center tread rubber 7b exceeds 35% of the entire peripheral length l of the ground contact region, an effect of improving braking and driving performances by enhancing rigidity of the intermediate region 10 tends to lessen.

Further, in a case where the peripheral length pc of the outer surface of the shoulder tread rubber 7c is less than 15% of the entire peripheral length l of the ground contact region, the intermediate tread rubber 7a having a relatively high rigidity occupies a significant part of a ground contact region in a cornering situation, whereby rigidity of a ground contact region in a cornering situation is unnecessarily high and vibration-absorbing properties and ground contact properties on an irregular road surface in a cornering situation deteriorate and generated lateral force tends to decrease. In a case where the peripheral length pc of the shoulder tread rubber 7c exceeds 35% of the entire peripheral length l, an effect of improving driving performance by enhancing rigidity of the intermediate region 10 tends to lessen.

Figure 2:
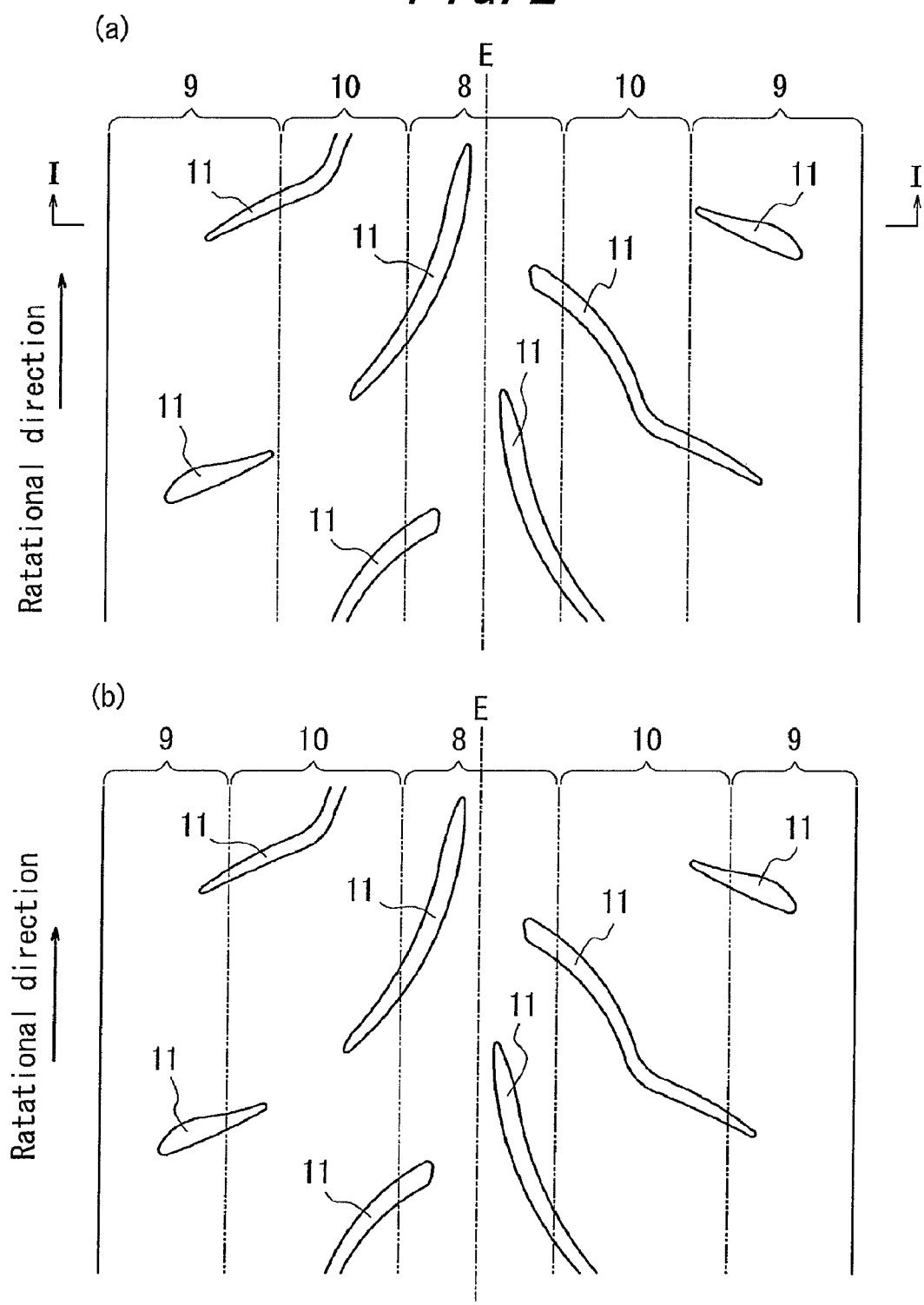
FIG. 2(*a*) and FIG. 2(*b*) are developed plan views each showing a tread pattern.

Further, in the tire of the present embodiment, as shown in developed plan views of tread patterns of FIGS. 2(a) and 2(b), slant grooves 11 extending in various directions and terminating within the land portions are formed at a surface of the tread rubber 7 within a ground contact region of the tread portion 1 such that slant grooves 11 are disposed in a herringbone shape with respect to the tire equatorial plane E and a negative ratio of these slant grooves 11, i.e. a ratio of areas of the grooves with respect to the ground contact area, is largest in the center region 8 and gradually decreases therefrom toward the respective shoulder regions 9.

In the present embodiment, the negative ratio of the center region 8 is set preferably in the range of 6-12%, more preferably in the range of 8-11%. The negative ratios of the intermediate region 10 and the shoulder region 9 are set preferably in the ranges of 3-9% and 1-7%, respectively.

In the tread pattern as shown in FIG. 2(b), the peripheral length pa of the outer surface of the intermediate tread rubber 7a, i.e. the intermediate region 10, is made longer and, as a result, the peripheral length pc of the outer surface of the shoulder region 9 is shortened, as compared with the tread pattern as shown in FIG. 2(a). The tread patterns of FIGS. 2(a) and 2(b) both satisfy the aforementioned structural requirements regarding, for example, 100% modulus, a negative ratio, and a peripheral length in the tire meridian direction and the like.

The tire structured as described above preferably has in the sidewall portion thereof some kind of display indicating that the tire is to be used for the rear wheel.

EXAMPLES

There were prepared Example tires, Comparative Example tires and Conventional tire for motorcycle, each having size 190/50ZR17, a carcass constituted of two carcass plies made of nylon cords, and a belt formed by a single belt layer structured by spiral winding of steel monofilaments, such that these test tires had 100% moduli and negative ratios as parameters as shown in Table 1. Each of these test tires was mounted to the rear wheel of a 1000 cc motorcycle having the front tire size of 120/70ZR17 and actually run on a road. Road gripping forces on a dry road surface and a wet road surface of each tire were evaluated, respectively, and the results shown in Table 2 were obtained.

Gripping force on a dry road surface and gripping force on a wet road surface were each evaluated by how an evaluation rider felt. The results are expressed as index values by using those of Conventional tire, where tread rubber was constituted of a single type of rubber, as control.

The larger index value represents the better result.

TABLE 1

|  | 100% modulus (MPa) of Center tread rubber | 100% modulus (MPa) of Intermediate tread rubber | 100% modulus (MPa) of Shoulder tread rubber | Negative ratio (%) of Center region | Negative ratio (%) of Intermediate region | Negative ratio (%) of Shoulder region |
| --- | --- | --- | --- | --- | --- | --- |
| Conventional tire | 1.38 | 1.38 | 1.38 | 6 | 6 | 4 |
| Example 1 | 1.38 | 1.68 | 1.28 | 9.7 | 5.9 | 3.1 |
| Example 2 | 1.38 | 1.68 | 1.28 | 8 | 5 | 4 |
| Example 3 | 1.38 | 1.68 | 1.28 | 10 | 8 | 6 |
| Comparative Example 1 | 1.38 | 1.1 | 1.28 | 9.7 | 5.9 | 3.1 |
| Comparative Example 2 | 1.38 | 1.68 | 1.28 | 5 | 5.9 | 3.1 |
| Comparative Example 3 | 1.38 | 1.68 | 1.28 | 9.7 | 12 | 3.1 |
| Comparative Example 4 | 1.38 | 1.68 | 1.28 | 9.7 | 2 | 1 |
| Comparative Example 5 | 1.38 | 1.68 | 1.28 | 9.7 | 5.9 | 6.5 |

TABLE 2

|  | Gripping force on dry road surface (Index value) | Gripping force on wet road surface (Index value) |
| --- | --- | --- |
| Conventional tire | 100 | 100 |
| Example 1 | 125 | 115 |
| Example 2 | 130 | 110 |
| Example 3 | 110 | 125 |
| Comparative Example 1 | 90 | 115 |
| Comparative Example 2 | 125 | 90 |
| Comparative Example 3 | 90 | 120 |
| Comparative Example 4 | 128 | 90 |
| Comparative Example 5 | 95 | 113 |

From Table 2, it is obvious that gripping force on a dry road and gripping force on a wet road can be ensured in a compatible manner in Example tires.

The invention claimed is:

1. A pneumatic tire for motorcycle, comprising:
a tread portion containing tread rubber having a layered structure including at least one layer;
a pair of sidewall portions extending on the inner side in the radial direction and provided continuous with respective side portions of the tread portion; and
bead portions provided continuous with the inner peripheral sides of the respective sidewalls,
wherein a ground contact region of the tread portion is constituted of five regions consisting of: a center region including the tire equatorial plane; a pair of shoulder regions including ground contact ends of the tread; and a pair of intermediate regions located between the center region and the respective shoulder regions,
100% modulus of a portion forming at least a ground contact surface of intermediate tread rubber provided across the entire part of each intermediate region is set larger than each of 100% modulus of a portion forming at least a ground contact surface of center tread rubber provided across the entire part of the center region and 100% modulus of a portion forming at least a ground contact surface of shoulder tread rubber provided across the entire part of each shoulder region, and
a negative ratio in the ground contact region of the tread is set so as to gradually increase from the respective shoulder regions toward the center region, and
the negative ratios of the center region, each intermediate region and each shoulder region are set in the ranges of 6-12%, 3-9% and 1-7%, respectively,
wherein 100% modulus of the center tread rubber is set larger than 100% modulus of the shoulder tread rubber.

2. The pneumatic tire for motorcycle of claim 1, wherein 100% modulus of the intermediate tread rubber is set in the range of 1.3 to 2.1 MPa.

3. The pneumatic tire for motorcycle of claim 1, wherein 100% modulus of a portion forming at least the ground contact surface of the center tread rubber is set in the range of 1.0 to 1.8 MPa, and 100% modulus of a portion forming at least the ground contact surface of the shoulder tread rubber in the range of 0.9 to 1.7 MPa.

4. The pneumatic tire for motorcycle of claim 1, wherein the sidewall portion has a display indicating that the tire is for use as a rear tire.

* * * * *